United States Patent [19]

Oyama et al.

[11] Patent Number: 5,298,312
[45] Date of Patent: Mar. 29, 1994

[54] NON-IRIDESCENT TRANSPARENT PRODUCT

[75] Inventors: Takuji Oyama; Yasuhiko Akao, both of Yokohama, Japan

[73] Assignee: Asahi Glass Company Ltd., Tokyo, Japan

[21] Appl. No.: 863,582

[22] Filed: Apr. 3, 1992

[30] Foreign Application Priority Data

Apr. 4, 1991 [JP] Japan .................. 3-99634

[51] Int. Cl.$^5$ ............................. L03C 17/23
[52] U.S. Cl. ..................... 428/216; 359/585; 359/586; 428/213; 428/432; 428/433; 428/469; 428/472; 428/697; 428/698; 428/699; 428/701; 428/702; 428/913
[58] Field of Search ............... 428/213, 216, 432, 433, 428/469, 472, 697, 698, 701, 702, 913, 699; 359/585, 586

[56] References Cited

U.S. PATENT DOCUMENTS

| | | | |
|---|---|---|---|
| 4,308,316 | 12/1981 | Gordon | 428/336 |
| 4,377,613 | 3/1983 | Gordon | 428/212 |
| 4,419,386 | 1/1983 | Gordon | 427/109 |
| 4,534,841 | 8/1985 | Hartig et al. | 428/426 |
| 4,690,871 | 9/1987 | Gordon | 428/432 |
| 4,900,630 | 2/1990 | Suzuki et al. | 428/701 |
| 5,079,089 | 1/1992 | Ito et al. | 428/216 |
| 5,112,675 | 5/1992 | Wuest et al. | 428/216 |
| 5,130,183 | 7/1992 | Muramachi et al. | 428/699 |

FOREIGN PATENT DOCUMENTS

| | | |
|---|---|---|
| 0436741 | 7/1991 | European Pat. Off. . |
| 2029181 | 12/1971 | Fed. Rep. of Germany . |
| 63-39535 | 8/1988 | Japan . |
| 63-206333 | 8/1988 | Japan . |
| 1-0059930 | 1/1989 | Japan . |
| 1-208344 | 8/1989 | Japan . |
| 1201046 | 8/1989 | Japan . |

OTHER PUBLICATIONS

Howson et al. "Optimized Transparent and Heat Reflecting Oxide and Nitride Films" SPIE 428, 16 (1983).

*Primary Examiner*—A. A. Turner
*Attorney, Agent, or Firm*—Oblon, Spivak, McClelland, Maier & Neustadt

[57] ABSTRACT

A non-iridescent transparent product comprising a transparent substrate, a transparent film having a refractive index of at least 1.6 and a thickness of at least 0.15 μm formed on the substrate, and an underlying layer formed at the boundary between the substrate and the film, wherein the underlying layer is an absorbing layer with an extinction coefficient k being not 0.

15 Claims, 8 Drawing Sheets

NON-IRIDESCENT TRANSPARENT PRODUCT

BACKGROUND OF THE INVENTION

1. Field of the Invention

The present invention relates to a non-iridescent transparent product.

2. Discussion of the Background

Heretofore, it has been common to form a transparent conductive film on a glass surface and use it as an electrode for display or as a low-emissivity glass. For example, indium-tin oxide (ITO) formed on a glass substrate by ion plating is commonly used as a transparent electrode for a display device such as a liquid crystal device. Further, a fluorine-doped tin oxide ($SnO_2$:F) film formed on a glass substrate by spraying is used as a low emissivity glass for houses. Recently, as new applications of a transparent conductive film, electromagnetic wave-shielding glass for buildings, electrically-heated windshields for automobiles and transparent conductive substrates for solar cells for consumer use have been developed. In each of these applications, a glass substrate with large area is required.

As the material constituting such a transparent conductive film, ITO, $SnO_2$:F and aluminum-doped zinc oxide (ZnO:Al) are available. However, with these transparent oxide materials, the reflectance at a wavelength satisfying the interference conditions, tends to be high, since the refractive index is as high as from 1.6 to 2.3, which is substantially higher than glass. Namely, if such a transparent oxide is formed on a glass substrate in a film thickness exceeding a certain level, maximums and minimums appear in the spectral reflection (transmission) spectrum as ripples. Accordingly, when such a film is formed on a glass substrate with a large area, the wavelength of the maximum reflection (transmission) tends to deviate due to the in-plane thickness variation (non-uniformity), which will be visually observed as iridescence of the reflected (transmitted) color.

It requires an extremely high level of technique to control the film thickness distribution on a glass surface to a level within ±5% by vapor deposition or CVD (chemical vapor deposition) when the glass sheet has a size of e.g. 1 m × 1 m. According to the study conducted by the present inventors, if the film thickness distribution is at this level, in-plane iridescence reaches a problematic level when the above-mentioned transparent film is formed on a glass substrate in a thickness of at least about 0.15 $\mu$m. On the other hand, when the thickness becomes at least about 0.6 $\mu$m, the iridescence starts to decrease. However, the thickness is required to be at least 3 $\mu$m, preferably at least 5 $\mu$m, in order to reduce the iridescence to a non-recognizable level.

Even if the film thickness distribution could be controlled quite uniformly, there still remain large ripples in the spectral reflection (transmission) spectrum, and such ripples will be visually recognized as a brilliant color when the film thickness is less than 3 $\mu$m. If such film is formed on a large size glass sheet, the maximum reflection (transmission) wavelength deviates depending upon the viewing angle i.e. the angle between the glass surface and the viewing direction, and the colors will thereby be changed, which will be observed as iridescence. Accordingly, it is desired to minimize ripples in the spectral reflection (transmission) spectrum.

If the film thickness is thinner than 0.15 $\mu$m, the degree of the film thickness distribution is at a level of ±75Å when a thickness distribution of ±5% is assumed, whereby no substantial in-plane iridescence due to the variation in the film thickness will be observed, but the iridescence due to the viewing angle will still be a problem.

Thus, when a transparent film is formed on a glass substrate in a thickness beyond a certain level, iridescence will be observed on the glass due to the in-plane thickness variation or due to the change in the viewing angle, which may substantially impair the commercial value of the product.

A few proposals have been made to prevent such iridescence. For example, a method is known wherein a transparent layer having a refractive index n=1.7 to 1.8 is formed between the transparent film and the glass substrate in a thickness corresponding to ¼ of the designed wavelength. Further, a method is also known in which a transparent layer having a refractive index n=1.6 to 1.7 and a thickness corresponding to ¼ of the wavelength and a transparent layer having a refractive index n=1.8 to 1.9 and a thickness corresponding to 1.4 of the wavelength are formed between the transparent thin film and the glass substrate sequentially in this order from the glass substrate side.

Further, as a practical method for forming a layer having a refractive index n=1.7 to 1.8 between a transparent film and a glass substrate, it is known to form a $SiC_xO_y$ film. This is based on the float method for the production of a sheet glass and comprises impinging a gas mixture of silane, an unsaturated hydrocarbon compound and carbon dioxide to a glass surface in a molten tin bath. This is basically a method of forming a transparent film having an intermediate refractive index by normal pressure CVD.

In each case, the thickness of the underlying transparent layer is required to be a thickness corresponding to ¼ of the designed wavelength of visible light, at the minimum. Therefore, in each case, the film forming method is normal pressure CVD. Normal pressure CVD is particularly effective from the viewpoint of low cost when a film is formed by a continuous treatment (on line) in a mass production process of glass. On the other hand, it has a drawback that it is not suitable for production of various types in small quantities or for forming multi-layers.

Therefore, in many cases, a sputtering method is employed for the production of heat reflecting glass for buildings or for automobiles. Also in the case of a transparent conductive substrate for display, it is common to employ a vacuum process from the viewpoint of the quality of the product. A vacuum process has such merits that it is readily possible to produce various types of high quality products in small quantities or to form a multi-layered film, and it is excellent in the control ability of the film thickness. Taking uniform coating to a large scale substrate into consideration, an in-line sputtering system is considered to be the best. Further, it has an additional merit that a combination with other vacuum process such as evaporation or plasma CVD can easily be designed. Therefore, it is desirable to form an underlying layer as mentioned above, by a sputtering system.

On the other hand, the sputtering method has a drawback that the film-forming speed is slow. Under the circumstances, various studies are being made to improve the film-forming speed. Especially, the film-forming speed of an oxide coating by reactive sputtering from a metal target is very slow. The present inventors previously found a transparent material with an intermediate refractive index which is stable and excellent in the durability and has a high film-forming speed, and proposed to use it as the underlying layer (Japanese Patent Application No 201148/1990) and also proposed to divide the underlying layer into two layers having low and high refractive indices (Japanese Patent Application No. 275240/1990). However, even such proposals were not entirely satisfactory from the viewpoint of the production efficiency.

SUMMARY OF THE INVENTION

It is an object of the present invention to solve the above problems and to provide a novel transparent non-iridescent product with a large area, which can be formed in a shorter period of time than ever by a vacuum process, particularly by a sputtering method.

The present invention provides a non-iridescent transparent product comprising a transparent substrate, a transparent film having a refractive index of at least 1.6 and a thickness of at least 0.15 μm formed on the substrate, and an underlying layer formed at the boundary between the substrate and the film, wherein the underlying layer is an absorbing layer with an extinction coefficient k being not 0.

Further, the present invention provides a non-iridescent transparent product comprising a transparent substrate, a transparent film having a refractive index of at least 1.6 and a thickness of at least 0.15 μm formed on the substrate, and an overlying layer formed on the transparent film, wherein the overlying layer is an absorbing layer with an extinction coefficient k being not 0.

DETAILED DESCRIPTION OF THE PREFERRED EMBODIMENTS

Figure 1:
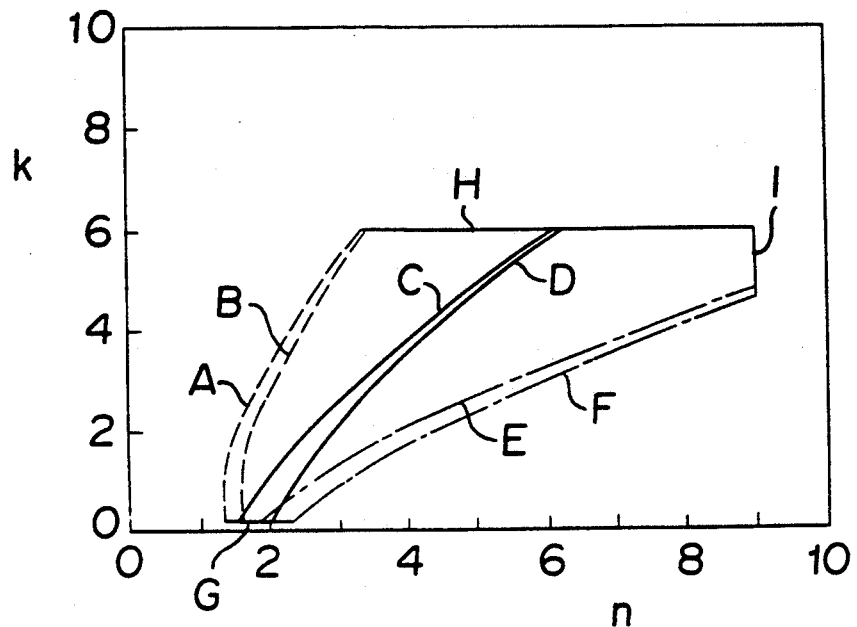
FIG. 1 is a graph showing preferred ranges of the refractive index n and the extinction coefficient k of the underlying layer of the present invention.

Now, the present invention will be described in detail with reference to the preferred embodiments.

In the present invention, various glass sheets, plastic films or plastic sheets may be used as the transparent substrate. The refractive index of the transparent substrate is preferably within a range of from 1.4 to 1.6. A typical refractive index of glass or plastics may be 1.51.

The transparent film of the present invention is a transparent thin film having a refractive index of at least 1.6, preferably from 1.8 to 2.3, and a thickness of at least 0.15 μm. In this invention, a "transparent film" means a film with an extinction coefficient k being as small a value as negligible for optical calculation ($k \approx 0$). Specifically, it is a film with $k < 0.01$. There is no particular restriction as to the material of which the film is made. Typical examples include transparent conductive materials such as ITO, $SnO_2$:F and ZnO:Al and non-conductive materials such as ZnO. Such materials are useful for heat mirrors for buildings, electromagnetic shielding glass, electrically-heated windshields for automobiles and ultraviolet shielding glass.

When a transparent film having a refractive index larger than a transparent substrate, specifically a refractive index of at least 1.6, particularly at least 1.8, is formed on the substrate, iridescence will be caused by interference of lights from the upper and lower boundaries of the transparent film with high refractive index. By the interference of lights, maximums and minimums (ripples) are generated in the spectral reflection (transmission) spectrum. Then, if the film thickness of the transparent film with high refractive index varies, the positions (wavelengths) of the maximums and the minimums vary, which will be observed as a variation in color. Otherwise, when the viewing angle is changed, the change in the positions (wavelengths) of the maximums and the minimums in the spectral reflection spectrum will be observed as a color change in the same fashion.

With respect to the reflectance due to the interference by the transparent film, amplitude reflectance r is represented by the formula (1):

$$r = \frac{r_A + r_B \exp(-i\delta)}{1 + r_A r_B \exp(-i\delta)} \quad (1)$$

where $r_A$ is the Frensnel reflection coefficient at the air/transparent film boundary, $r_B$ is the Frensnel reflection coefficient at the transparent film/substrate boundary, and δ is the phase difference within the transparent film layer, which is represented by the formula (2):

$$\delta = \frac{4\pi n d \cos \theta}{\lambda} \quad (2)$$

where n is the refractive index of the transparent film, d is the thickness of the transparent film, θ is the angle between the propagation direction of light in the transparent film and the normal line to the substrate plane, and $\lambda$ is the wavelength of light in vacuum. Measured reflectance R is energy reflectance, and it is a square of the absolute value of amplitude reflectance r. Here, when $|r_A r_B| << 1$, it may be represented by the following formula with the denominator approximated to be 1:

$$R = |r|^2 \sim |r_A + r_B \exp(-i\delta)|^2$$
$$= |r_A|^2 + |r_B|^2 + 2|r_A||r_B| \cos \delta$$

This indicates that the size of a ripple due to the film thickness variation (i.e. due to the variation of $\delta$) is $4|r_A||r_B|$. Namely, the amplitude of a ripple is proportional to the product of the Fresnel reflection coefficients at the upper and lower boundaries. Accordingly, the ripple will disappear if it is possible to make the Fresnel reflection coefficient at either one of the upper and lower boundaries zero, which is equal to preventing the reflection at this boundary.

The simplest method for preventing reflection at the upper or lower boundary of a transparent product comprising a transparent substrate and a transparent film formed thereon is to form a single layer anti-reflection coating. This can be accomplished by forming a transparent layer having a refractive index corresponding to the square root of the product of the refractive indices of the two materials constituting the boundary (i.e. the transparent substrate and the transparent film in the case of the lower boundary, and the transparent film and air in the case of the upper boundary) in an optical thickness corresponding to $\frac{1}{4}$ of the wavelength of the light to be prevented from reflection. This is the significance of the underlying layer used in a non-iridescent transparent product according to the conventional technique.

The present inventors have previously proposed to use a transparent double-layered film with low/high refractive indices instead of this $\frac{1}{4} \lambda$ layer having an intermediate refractive index (Japanese Patent Application No. 275240/1990). By this proposal, it has been made possible to shorten the time required for forming such transparent film by a sputtering method to a level of about one half. The present invention is intended to further shorten the time required for the film forming substantially by using an absorbing layer as this antireflection layer. In the present invention, "the absorbing layer" is a layer with an extinction coefficient k being not 0, i.e. a layer with an extinction coefficient k of a level which is not negligible for optical calculation. Specifically, it is a layer with $k \geq 0.01$, preferably $k \geq 0.1$, more preferably $k \geq 0.2$.

Figure 5:
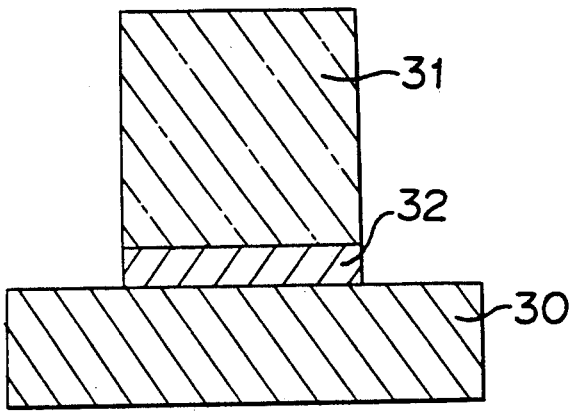
FIG. 5 is a schematical cross-sectional view of one embodiment of the present invention.

The absorbing underlying layer to be used in the present invention, will be described with reference to FIG. 5. With the underlying layer, the refractive index n, the extinction coefficient k and the film thickness d of the underlying layer 32 have to be selected so that at a designed wavelength $\lambda$ in the visible light region, the absolute value of the effective Fresnel reflection coefficient on the transparent film 31 side at the combined boundary of transparent substrate 30/underlying layer 32/transparent film 31 is smaller than the absolute value of the Fresnel reflection coefficient on the transparent film 31 side at the boundary of transparent substrate 30/transparent film 31 in a case where such an underlying layer 32 is not formed. This is represented by the following formula, wherein n is the refractive index of the absorbing underlying layer 32 at the wavelength $\lambda$ in question, k is the extension coefficient, d is the film thickness, $n_s$ is the refractive index of the transparent substrate 30 and $n_f$ is the refractive index of the transparent film 31:

$$\left| \frac{r_1 + r_2 \exp(-i\delta)}{1 + r_1 r_2 \exp(-i\delta)} \right| < \left| \frac{n_s - n_f}{n_f + n_s} \right| \quad (3)$$

where:

$$r_1 = \frac{n - n_f - ik}{n_f + n - ik} \quad (4)$$

$$r_2 = \frac{n_s - n + ik}{n + n_s - ik} \quad (5)$$

$$\delta = \frac{4\pi(n - ik)d}{\lambda} \quad (6)$$

Therefore, it is necessary to select n, k and d of the absorbing underlying layer 32 to satisfy the formula (3). For this purpose, n and k of the absorbing underlying layer may actually be measured, and then a layer thickness to satisfy the formula (3) is calculated. Then, an absorbing underlying layer may be formed to have such a film thickness. Further, it is readily possible to ascertain whether or not the absorbing underlying layer thus formed satisfies the formula (3), by preparing a sample having the absorbing underlying layer 32 incorporated and a sample having no such underlying layer incorporated, measuring the spectral reflectance on the transparent film 31 side of each sample, and comparing the amplitudes of the ripples of both samples. Namely, in the case where the formula (3) is satisfied, the ripple will be smaller with the sample having the absorbing underlying layer 32 incorporated.

The ripple will be minimum at the designed wave length $\lambda$ and tends to be larger as the wavelength departs from $\lambda$. The designed wavelength $\lambda$ is a wavelength within the visible light region (from 3,600 Å to 8,300 Å). Since the human eyes are most sensitive to lights of from 5,500 Å (green) to 6,000 Å (red), it is preferred to select $\lambda$ within this range.

Here, the ranges of n, k and d satisfying the formula (3) are fairly wide. As a result of an extensive research, the present inventors have found that the preferred values of n and k of the absorbing underlying layer 32 are preferably within the region (inclusive of the boundary line) defined by curve A ... straight line H ... straight line I ... curve F ... straight line G in FIG. 1, more preferably within the region (inclusive of the boundary line) defined by curve A' ... straight line H ... curve F' ... straight line G in FIG. 2. This means that when the n and k values of the underlying layer are within this range, it is possible, by properly selecting the film thickness d, to adjust the value of the left side of the formula (3) sufficiently small and to increase the antireflection effect, i.e. ripple-suppressing effect. Contrary, if the n and k values are outside this range, it is impossible or very difficult to bring the value at the left side of the formula (3) sufficiently small even if the film thickness d is selected at any level of practical use.

Figure 2:
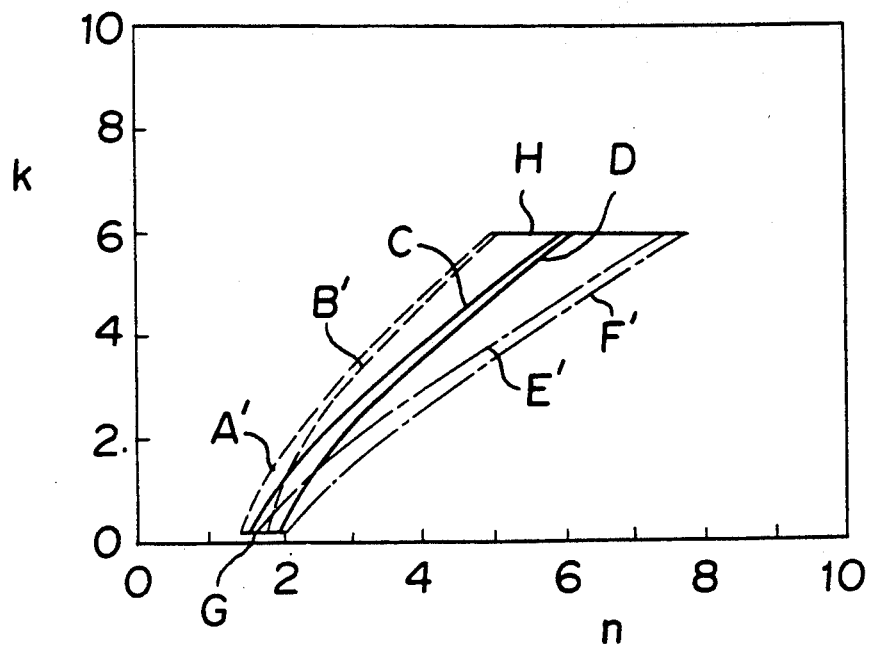
FIG. 2 is a graph showing more preferred ranges of the refractive index n and the extinction coefficient k of the underlying layer of the present invention.

When the left side of the formula (3) is represented by $|r|$ and the right side thereof is represented by $|r_0|$, curves C and D in each of FIGS. 1 and 2 indicate the n and k values of the underlying layer which satisfy $|r| \approx 0$. Likewise, curves A, B, E and F in FIG. 1 indicate the values which satisfy $|r| \approx 0.5 |r_0|$, and curve A', B', E' and F' in FIG. 2 indicate the values which satisfy $|r| \approx 0.2 |r_0|$. In each of the absolute value (at a designed wavelength $\lambda$ of 5,500 Å) of the effective Frensnel reflection coefficient on the transparent film side at the combined boundary of transparent substrate ($n_s = 1.515$)/underlying layer (n, k)/transparent film. Curves A, C and E in FIG. 1 and curves A', C and E' in FIG. 2 represent cases where the refractive index $n_f$ of the transparent film is 1.6, and curves B, D and F in FIG. 1 and curves B', D and F' in FIG. 2 represent cases where the refractive index $n_f$ of the transparent film is 2.3. Accordingly, when the refractive index $n_s$ of the transparent substrate is 1.515 at $\lambda = 5,500$ Å, the n and k values of the underlying layer are preferably contained in the region at the right hand side below of curve A and the left hand side above of curve F.

Further, $k \geq 0.2$ (straight line G) is intended so that the thickness of the absorbing underlying layer may be thin. Namely, if $k < 0.2$, the film tends to be transparent, whereby the film thickness will have to be very thick to attain the function as the underlying layer. On the other hand, when $k > 6.0$ (straight line H) and $n > 9.0$ (straight line I), the film thickness to attain the function as the underlying layer, tends to be too small, and it is practically difficult to form such a film.

Accordingly, when $\lambda = 5,500$ Å and the refractive index $n_f$ of the transparent substrate is 1.515, the n and k values of the underlying layer are preferably within the region (inclusive of the boundary line) defined by curve A. .straight line H. .straight line I . . . curve F . . . straight line G in FIG. 1, more preferably within the region (inclusive of the boundary line) defined by curve A'. . . straight line H .curve F'. . . straight line G in FIG. 2.

Figure 14:
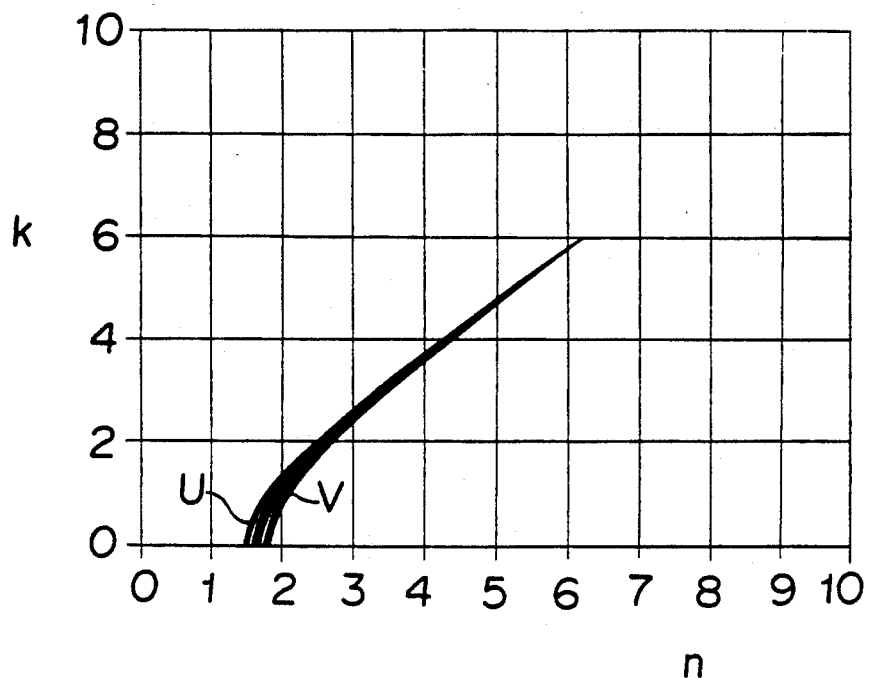
FIG. 14 is a graph showing the examples of refractive index n and the extinction coefficient k of an underlying layer of the present invention.
Figure 15:
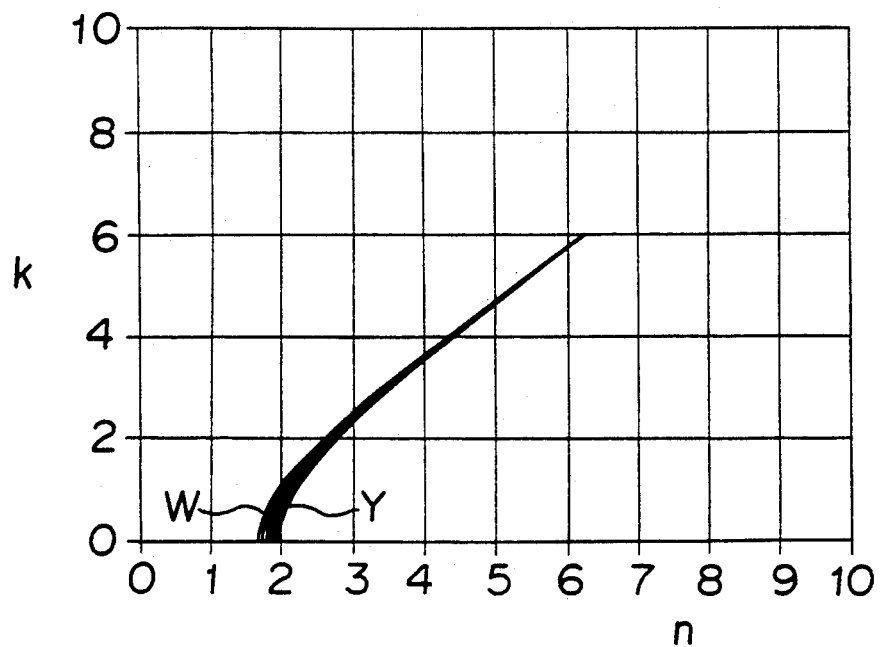
FIG. 15 is a graph showing the examples of refractive index n and the extinction coefficient k of another underlying layer of the present invention.

FIGS. 14 and 15 are graphs showing the n and k values of the underlying layers, which satisfy $|r| \approx 0$ at $\lambda = 6,328$ Å when the left side of the formula (3) is represented by $|r|$. FIG. 14 represents a case where the refractive index $n_s$ of the transparent substrate is 1.4, and FIG. 15 represents a case where the refractive index $n_s$ of the transparent substrate is 1.6. The curves in the figures show the n and k values corresponding to the respective cases wherein the refractive index $n_f$ of the transparent film differs by 0.1 from one to another. Curve U at the left side top in FIG. 14 represents a case where $n_f = 1.6$. Curve W at the left hand side top in FIG. 15 represents a case where $n_f$ is slightly larger than 1.6. Curves V and Y in FIGS. 14 and 15 represent cases where $n_f = 2.3$. From FIGS. 14 and 15, it is evident that the n and k values preferred for the underlying layer do not substantially change, even when the refractive index $n_s$ of the transparent substrate and the refractive index $n_f$ of the transparent film have changed within the ranges of $n_s = 1.4$ to 1.6 and $n_f = 1.6$ to 2.3, respectively.

Accordingly, also the n and k values in FIGS. 1 and 2 do not substantially change even when the refractive index $n_s$ of the transparent substrate or the refractive index $n_f$ of the transparent film have changed.

The thickness of the absorbing underlying layer as described above, is selected so that the n and k values of the absorbing underlying layer satisfy the formula (3), and it is preferably within a range of from 10 to 500 Å from the viewpoint of the ripple-preventing effect and the productivity.

The material for the absorbing underlying layer to be used in the present invention, may be a metal substance, a nitride, a carbide or a complex thereof. Preferably, a single layer film composed mainly of at least one metal substance selected from the group consisting of titanium, chromium and zirconium, or at least one of nitrides and carbides of such metals, or a composite thereof, is employed in view of the ripple-preventing effect and the economy. Among them, titanium nitride is excellent in the durability and is thus preferred for practical use. In such a case, the film thickness of titanium nitride is preferably from 20 to 200 Å with a view to preventing ripples.

By the underlying layer thus formed, it is possible to reduce ripples formed by interference at the upper and lower boundaries of the transparent film, with respect to light which enters into the transparent film from the opposite side of the transparent substrate and goes out to the opposite side of the transparent substrate.

In the foregoing, the underlying layer of the present invention has been described with respect to a case where the underlying layer has a single-layer structure of an absorbing film. However, such an underlying layer may be composed of a plurality of layers. In such a case, the formulas (3) to (6) showing the conditions of the present invention will take more complicated forms. However, if an effective Frensnel reflection coefficient of the overall underlying layer composed of such a plurality of layers is taken into account, exactly the same theory as discussed above will apply. Especially the practical method for judgment by the spectral reflectance to determine whether or not the conditions are satisfied, is applicable exactly in the same manner as in the case of the single layer film.

Figure 6:
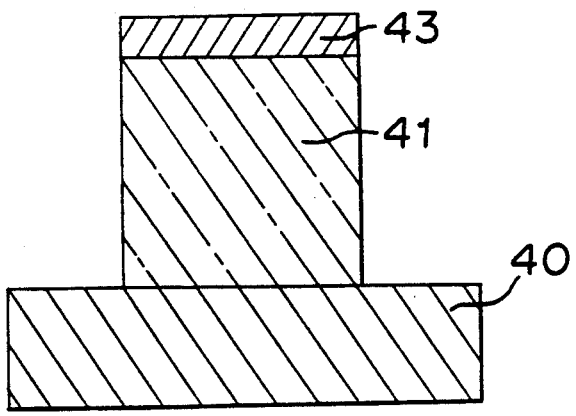
FIG. 6 is a schematical cross-sectional view of another embodiment of the present invention.

On the other hand, exactly the same theory as for the underlying layer will apply to an overlying layer. Namely, referring to FIG. 6, the refractive index n, the extinction coefficient k and the film thickness d of the overlying layer 43 have to be selected so that at a designed wavelength $\lambda$ in the visible light region, the absolute value of the effective Frensnel reflection coefficient on the transparent film 41 side at the combined boundary of transparent film 41/overlying layer 43/air is smaller than the absolute value of the Frensnel reflection coefficient on the transparent film 41 side at the boundary of transparent film 41/air in a case where such an overlying layer 43 is not formed.

This is represented by the following formula where n is the refractive index of the absorbing overlying layer 43 at the wavelength $\lambda$ in question, k is the extinction coefficient, d is the film thickness, and $n_f$ is the refractive index of the transparent film 41, and the refractive index of air is assumed to be 1.0:

$$\left| \frac{r_3 + r_4 \exp(-i\delta)}{1 + r_3 r_4 \exp(-i\delta)} \right| < \left| \frac{1.0 - n_f}{n_f + 1.0} \right| \quad (7)$$

where:

$$r_3 = \frac{n - n_f - ik}{n_f + n - ik} \quad (8)$$

$$r_4 = \frac{1.0 - n + ik}{n + 1.0 - ik} \quad (9)$$

$$\delta = \frac{4\pi(n - ik)d}{\lambda} \quad (10)$$

Therefore, it is necessary to select n, k and d of the absorbing overlying layer 43 to satisfy the formula (7) For this purpose, n and k of the absorbing overlying layer may actually be measured, and then a layer thickness satisfying the formula (7) may be calculated. Then, an absorbing overlayer may be formed to have such a layer thickness. Further, it is readily possible to ascertain whether or not the absorbing overlying layer 43 thus formed satisfies the formula (7), by preparing a sample having the absorbing overlying layer 43 formed and a sample having no such an overlying layer 43 formed, measuring the spectral reflectance on the transparent film 41 side of each sample, and comparing the amplitudes of the ripples of both samples. Namely, in the case where the formula (7) is satisfied, the ripple will be smaller with the sample having the absorbing overlying layer 43 formed.

Here, the ranges of n, k and d satisfying the formula (7) are fairly wide. As a result of an extensive research, the present inventors have found that the preferred values of n and k of the absorbing overlying layer 43 are preferably within the region (inclusive of the boundary line) defined by curve J . . . straight line S . . . straight line T . . . curve Q . . . straight line R in FIG. 3, more preferably within the region (inclusive of the boundary line) defined by curve J'. . . straight line S . . . curve Q'. . . straight line R in FIG. 4. This means that when the n and k values of the overlying layer are within this range, it is possible, by properly selecting the film thickness d, to adjust the value of the left side of the formula (7) sufficiently small and to increase the anti-reflection effect, i.e. ripple-suppressing effect. Contrary, if the n and k values are outside this range, it is impossible or quite difficult to bring the value at the left side of the formula (7) sufficiently small even if the film thickness d is selected at any level of practical use.

When the left side and the right side of the formula (7) are represented by $|r|$ and $|r_0|$, respectively, curves J and K in FIG. 2 indicate the n and k values of the overlying layer which satisfy $|r| \approx 0$. Likewise, curves J, K, P and Q in FIG. 3 indicate the values which satisfy $|r| \approx 0.5 \, |r_0|$, and curves J', K', P' and Q' in FIG. 4 indicate the values which satisfy $|r| \approx 0.2 \, |r_0|$. Here, $|r|$ is the absolute value (at a designed wavelength $\lambda = 5,500$ Å) of an effective Frensnel reflection coefficient on the transparent film side at the combined boundary of transparent film/overlying layer (n, k)/air. Curves J, L and P in FIG. 3 and curves J', L and P' in FIG. 4 represent cases where the refractive index $n_f$ of the transparent film is 1.6, and curves K, M and Q in FIG. 3 and curves K', M and Q' in FIG. 4 represent cases where the refractive index $n_f$ of the transparent film is 2.3. Accordingly, at a designed wavelength $\lambda = 5,500$ Å, the n and k values of the overlying layer are preferably contained in the region at the right hand side below of curve J and the left hand side above of curve Q.

Further, $k \geq 0.2$ (straight line R) is intended so that the film thickness of the absorbing overlying layer may be thin, and with respect to straight lines S and T, the same theory as described above with respect to the absorbing under layer will apply.

Figure 3:
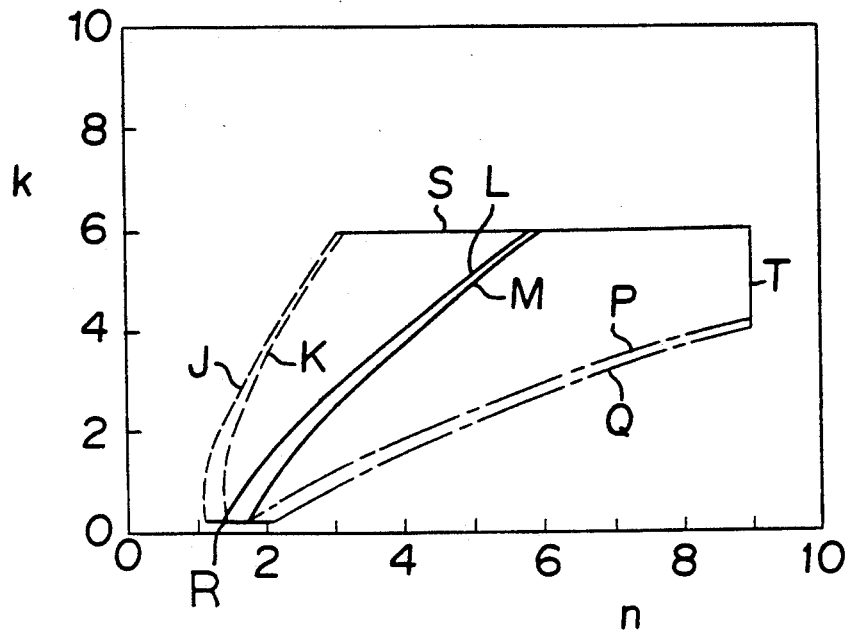
FIG. 3 is a graph showing preferred ranges of the refractive index n and the extinction coefficient k of the overlying layer of the present invention.
Figure 4:
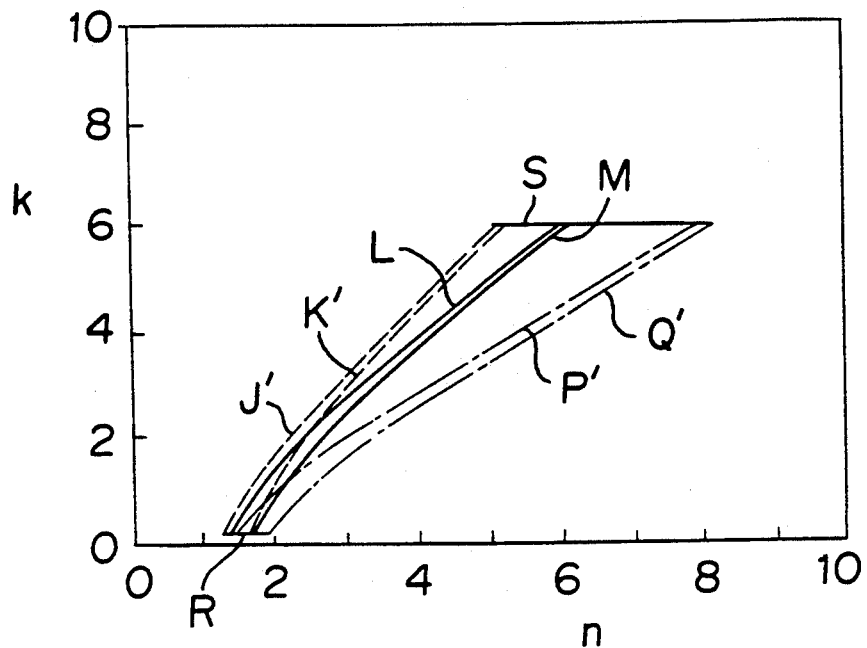
FIG. 4 is a graph showing more preferred ranges of the refractive index n and the extinction coefficient k of the overlying layer of the present invention.

Accordingly, the n and k values of the overlying layer are preferably within the region (inclusive of the boundary line) defined by curve J . . . straight line S . . . straight line T . . . curve Q . . . straight line R in FIG. 3, more preferably within the region (inclusive of the boundary line) defined by curve J'. . . straight line S . . . curve Q'. . . straight line R in FIG. 4, at a designed wavelength $\lambda$ of 5,500 Å.

The thickness of the absorbing overlying layer is selected so that the n and k values of the absorbing overlying layer satisfy the formula (7) Specifically, the thickness is preferably within a range of from 20 to 500 Å from the viewpoint of the ripple-suppressing effect and the productivity.

As the material for the overlying layer to be used in the present invention, a metal substance, a nitride, a carbide or a complex thereof may be mentioned. Preferably, a single layer film composed essentially of at least one metal substance selected from the group consisting of titanium, chromium and zirconium, or at least one of nitrides or carbides of such metals, or a composite thereof, is employed from the viewpoint of the ripple-suppressing effect and the economical advantage. Among them, titanium nitride is excellent in the durability and is thus practically preferred. In this case, the thickness of titanium nitride is preferably from 80 to 300 Å from the viewpoint of suppressing ripples.

By the overlying layer thus formed, it is possible to reduce ripples formed by interference at the upper and lower boundaries of the transparent film with respect to light which enters into the transparent film from the transparent substrate side and which goes out to the transparent substrate side.

In the foregoing, the overlying layer of the present invention has been described as having a single layer structure of an absorbing film. However, as mentioned above with respect to the underlying layer, the overlying layer may also be composed of a plurality of layers.

Further, a second transparent substrate may be laminated on such overlying layer to obtain a non-iridescent transparent product having a structure of first transparent substrate/transparent film/overlying layer/second transparent substrate. In this case, it is necessary that at a designed wavelength in the visible light region, the absolute value of the effective Frensnel reflection coefficient on the transparent film side at the combined boundary of transparent film/overlying layer/second transparent substrate is smaller than the absolute value of the Frensnel reflection coefficient on the transparent film side at the boundary of transparent film/second transparent substrate in a case where no such overlying layer is formed.

By the overlying layer thus formed, it is possible to reduce ripples formed by interference at the upper and lower boundaries of the transparent film with respect to light which enters into the transparent film from the first transparent substrate side and which goes out to the first transparent substrate side.

The second transparent substrate may be the same as the first transparent substrate.

Figure 8:
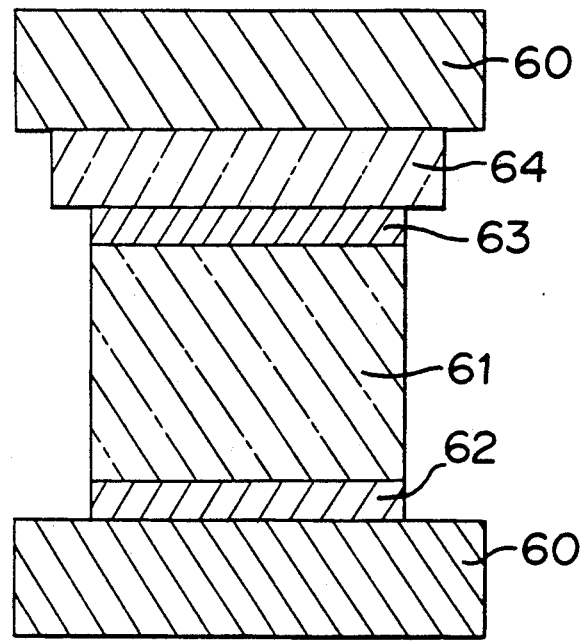
FIG. 8 is a schematical cross-sectional view of a still further embodiment of the present invention.

For example, as shown in FIG. 8, a non-iridescent transparent product of the present invention may be prepared in the form of a laminated glass in which an additional glass substrate 60 is laminated on the overlying layer 63 side of an assembly of transparent substrate 60/(underlying layer 62)/transparent film 61/overlying layer 63 with an interlayer 64 made of a plastic such as polyvinyl butyral (PVB) interposed. In this case, if the interlayer 64 has the same refractive index as the glass substrate, the overlying layer 63 is required to satisfy the same conditions as described above with respect to the underlying layer between the transparent glass substrate and the transparent film.

Namely, it is preferred that at a designed wavelength $\lambda$ in the visible light region, the absolute value of the effective Frensnel reflection coefficient on the transparent film side at the combined boundary of transparent film 61/overlying layer 62/interlayer (second transparent material) 64 is smaller than the absolute value of the Frensnel reflection coefficient on the transparent film 61 side at the boundary of transparent film 61/interlayer 64 in a case where such an overlying layer 62 is not formed.

In the case of an absorbing film, the reflectance from one side is different from the reflectance from the other side. This is the major difference from the reflection prevention in the anti-reflection coating by means of a transparent film (a non-absorbing film). Therefore, when an anti-reflection layer by means of a transparent film is formed as an overlying layer or an underlying layer, ripples in both the reflection from the transparent substrate side and the reflection from the rear side can simultaneously be suppressed. Whereas, in a case where an absorbing film is used, for example, in a case where an underlying layer according to the present invention is formed, reflection ripples measured from the air side can be suppressed, but the reflection ripples measured from the transparent substrate side are likely to rather increase. Inversely, when an overlying layer according to the present invention is formed, the reflection ripples measured from the transparent substrate side can be suppressed, but the reflection ripples measured from the air side are likely to rather increase.

Figure 7:
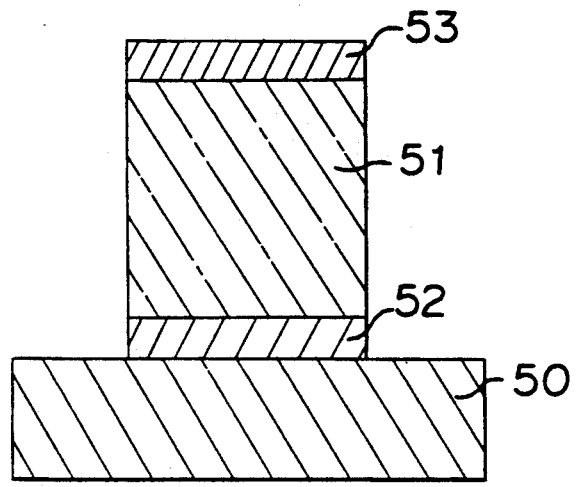
FIG. 7 is a schematical cross-sectional view of a further embodiment of the present invention.

Accordingly, in order to suppress the reflection ripple from both sides simultaneously by employing the present invention, it is effective to form both the underlying layer 52 and the overlying layer 53 according to the present invention to constitute a structure of transparent substrate 50/underlying layer 52/transparent film 51/overlying layer 53 as shown in FIG. 7 or a structure as shown in FIG. 8.

By the underlying layer and the overlying layer thus formed, the ripples in the spectral reflectance will be reduced, whereby iridescence will be reduced. The degree of the reduction of iridescence may be represented by the following ripple ratio of spectral reflectance. For the determination of the "ripple ratio", an envelope curve (curve A) is drawn by connecting the maximum points on the spectral reflectance curve, and an envelope curve (curve B) is drawn by connecting the minimum points on the spectral reflectance curve. Then, ripple $R_i$ and ripple ratio $R_r$ at a certain wavelength are defined by the following formulas:

$$\text{ripple } R_i = a - b \, (\%)$$

$$\text{ripple ratio } R_r = \frac{a - b}{a + b} \times 100 \, (\pm\%)$$

where a is the value on curve A corresponding to that wavelength, and b is the value on curve B corresponding to that wavelength.

Such a "ripple ratio" is a value wherein the influence of the reflectance level over ripples is taken into account. Thus, it represents the degree of iridescence actually recognizable by human eyes. According to the present invention, by the formation of the underlying layer or the overlying layer, the ripple ratio is reduced as compared with the case where such an underlying layer or an overlying layer is not formed.

The degree of reduction of iridescence by the non-iridescent transparent product of the present invention is preferably such that the minimum value of the ripple ratio at wavelengths throughout the entire visible light region is at most ±30%, more preferably at most ±10%. If the minimum value of the ripple ratio exceeds ±30%, iridescence tends to be remarkable. It is particularly preferred that the minimum value of the ripple ratio in the visible light region is at most ±30% with respect to each of the spectral reflectance of the transparent film measured from the transparent substrate side and the spectral reflectance measured from the opposite side.

EXAMPLES

Now, the present invention will be described in further detail with reference to Examples. However, it should be understood that the present invention is by no means restricted by such specific Examples.

EXAMPLE 1

A glass substrate (refractive index: 1.51) was set in a vacuum chamber, which was evacuated to $1 \times 10^{-5}$ Torr. Then, a gas mixture of Ar and $N_2$ was introduced, and a titanium target was subjected to DC (direct current) sputtering under a pressure of $3 \times 10^{-3}$ Torr, whereby a film of titanium nitride was formed on the glass substrate in a thickness of 300 Å. The optical constants of this film were determined, whereby n=1.98 and k=1.53 at a wavelength of 6,328 Å. From these n and k values, the thickness of an underlying layer of a non-iridescent transparent product to be formed, was determined to be 80 Å.

Then, a separate glass substrate 30 was set in a vacuum chamber, and an underlying layer 32 of titanium nitride was formed in a thickness of 80 Å in the same manner.

Figure 9:
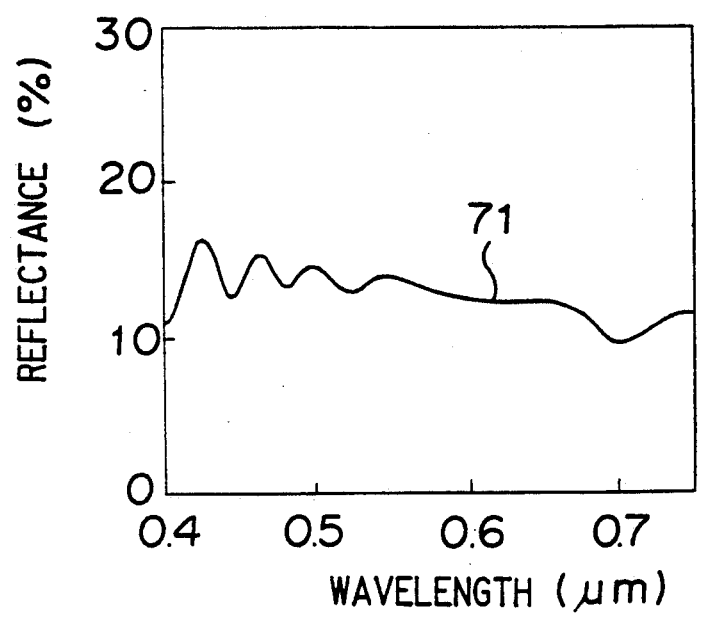
FIG. 9 is a graph showing the spectral reflection curve of sample 1 of Example 1.

On this underlying layer, a transparent film 31 of ITO was formed in a thickness of 1.0 μm by ion plating. The product was designated as sample 1 (structure of FIG. 5). The spectral reflectance curve measured from the film surface side of this sample is shown by 71 in FIG. 9.

EXAMPLES 2 TO 6

Samples were prepared in the same manner as in Example 1 except that the combination of the underlying layer and the transparent film was changed as shown in Table 1. (Example 1 is also shown in the Table.)

TABLE 1

|  | Underlying layer 32 | | Transparent film 31 | | |
|---|---|---|---|---|---|
|  | Material (*1) | Thickness (Å) | Material (*3) | Film-forming method (*2) | Thickness (μm) |
| Example 1 | TiN | 80 | ITO | IP | 1.0 |
| Example 2 | CrN | 60 | ITO | IP | 1.0 |
| Example 3 | CrC | 30 | $SnO_2$ | IP | 0.8 |
| Example 4 | ZrN | 90 | ZnO:Al | SP | 0.4 |
| Example 5 | TiN/Cr | 20/20 | ITO | IP | 1.0 |

TABLE 1-continued

| | Underlying layer 32 | | Transparent film 31 | | |
|---|---|---|---|---|---|
| | Material (*1) | Thickness (Å) | Material (*3) | Film-forming method (*2) | Thickness (μm) |
| Example 6 | TiN/Ti/TiN | 20/10/20 | ITO | IP | 1.0 |

(*1) Example 5 represents a structure of glass substrate/TiN/Cr/ITO.
Example 6 represents a structure of glass substrate/TiN/Ti/TiN/ITO.
(*2) IP means ion plating, and SP means sputtering. The underlying layer was formed by sputtering in every case.
(*3) The amount of Al doped in ZnO:Al is 2 wt % as oxide ($Al_2O_3/(Al_2O_3 + Zn)$).

EXAMPLE 7

Figure 10:
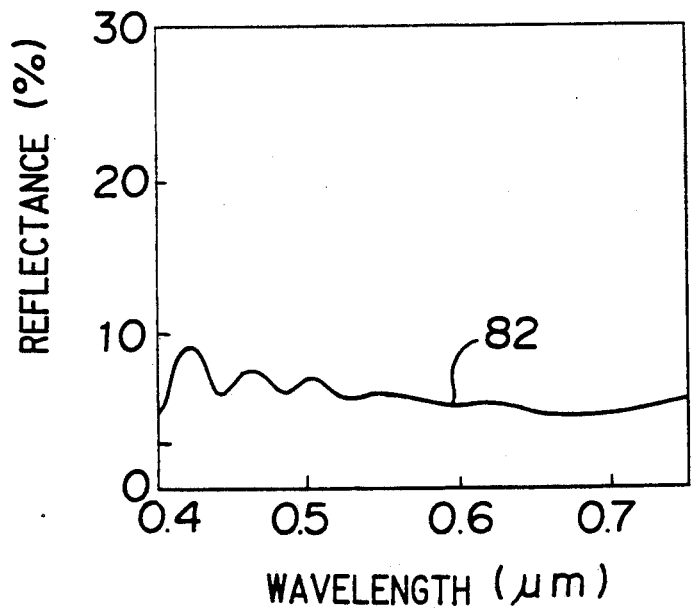
FIG. 10 is a graph showing the spectral reflection curve of sample 2 of Example 7.

The same glass substrate 40 as used in Example 1 was set in a vacuum chamber, and a transparent film 41 of ITO was formed in a thickness of 1 μm by ion plating. On this transparent film, an overlying layer 43 of titanium nitride was formed in a thickness of 150 Å by DC sputtering (structure of FIG. 6). This product was designated as sample 2. The spectral reflectance curve measured from the glass surface side of this sample is shown by 82 in FIG. 10.

EXAMPLES 8 TO 12

Samples were prepared in the same manner as in Example 7 except that the combination of the overlying layer and the transparent film was changed as shown in Table 2. (Example 7 is also shown in the Table.)

TABLE 2

| | Transparent film 41 | | | Overlying layer 43 | |
|---|---|---|---|---|---|
| | Material (*3) | Film-forming method (*2) | Thickness (μm) | Material (*1) | Thickness (Å) |
| Example 7 | ITO | IP | 1.0 | TiN | 150 |
| Example 8 | ITO | IP | 1.0 | CrN | 70 |
| Example 9 | SnO₂ | IP | 0.8 | CrC | 60 |
| Example 10 | ZnO:Al | SP | 0.4 | ZrN | 200 |
| Example 11 | ITO | IP | 1.0 | Cr/TiN | 20/80 |
| Example 12 | ITO | IP | 1.0 | Cr/ZrN | 20/120 |

(*1) Example 11 represents a structure of glass substrate/ITO/Cr/TiN.
Example 12 represents a structure of glass substrate/ITO/Cr/ZrN.
(*2) IP means ion plating, and SP means sputtering. The overlying layer was formed by sputtering in every case.
(*3) The amount of Al doped in ZnO:Al is 2 wt % as oxide ($Al_2O_3/(Al_2O_3 + ZnO)$).

EXAMPLE 13

Figure 11:
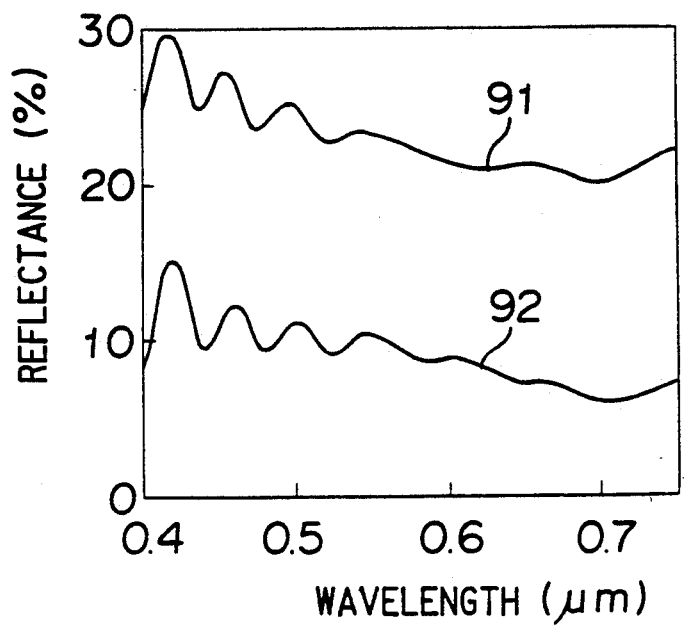
FIG. 11 is a graph showing the spectral reflection curve of sample 3 of Example 13.

On the same glass substrate as used in Example 1, an underlying layer 52 (about 80 Å) of titanium nitride and a transparent film 51 (1.0 μm) of ITO were formed in the same manner as in Example 1. Then, an overlying layer 53 of titanium nitride was formed thereon in a thickness of 150 Å (structure of FIG. 7). This product was designated as sample 3. The spectral reflectance curves measured from the film surface side and the glass surface side of this sample are shown by 91 (film surface side) and 92 (glass surface side) in FIG. 11.

EXAMPLES 14 TO 16

Samples were prepared in the same manner as in Example 13 except that the combination of the underlying layer and the overlying layer was changed as shown in Table 3. Here, the transparent film was a ITO film formed by ion plating, and its thickness was 1.0 μm.

TABLE 3

| | Underlying layer 52 | | Overlying layer 53 | |
|---|---|---|---|---|
| | Material (*1) | Thickness (Å) | Material (*1) | Thickness (Å) |
| Example 13 | TiN | 80 | TiN | 150 |
| Example 14 | TiN | 80 | ZrN | 200 |
| Example 15 | CrC | 30 | Cr/TiN | 20/80 |
| Example 16 | TiN/Cr | 20/20 | Cr/ZrN | 20/120 |

(*1) Example 16 represents a structure of glass substrate/TiN/Cr/ITO/Cr/TiN. The underlying and overlying layers were formed by sputtering.

EXAMPLE 17

In the same manner as in Example 1, an underlying layer 62 of titanium nitride and a transparent film 61 of ITO were formed on a glass substrate 60. Then, an overlying layer 63 of titanium nitride was formed thereon in a thickness of 80 Å by DC sputtering. Another sheet of glass substrate 60 was bonded thereto with an interlayer 64 (refractive index: 1.51) of PVB interposed, to obtain a laminated glass (structure of FIG. 8). This product was designated as sample 4. The spectral reflectance curves measured from both sides of this sample are shown by 101 (another glass substrate side) and 102 (the first glass substrate side) in FIG. 12.

COMPARATIVE EXAMPLE 1

Figure 13:
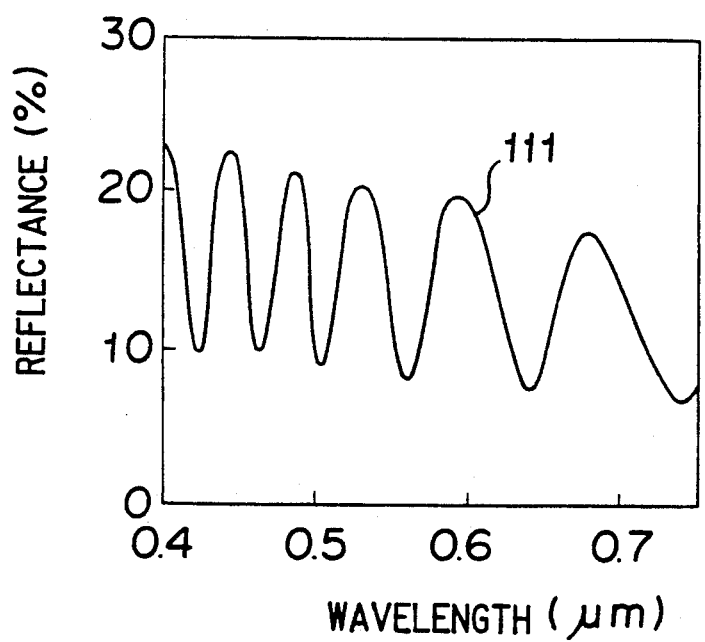
FIG. 13 is a graph showing the spectral reflection curve of the sample of Comparative Example 1.

A glass substrate was set in a vacuum chamber, which was evacuated to $1 \times 10^{-5}$ Torr. Then, an ITO film was formed in a thickness of 1 μm by ion plating. The spectral reflectance curve measured from the film surface side of this sample is shown by 111 in FIG. 13. Although not shown in the figure, the spectral reflectance curve measured from the glass surface side was substantially the same as that measured from the film surface side in the visible region.

COMPARATIVE EXAMPLE 2

A glass substrate was set in a vacuum chamber, which was evacuated to $1 \times 10^{-5}$ Torr. Then, a $ZrSi_xO_y$ film was formed in a thickness of 900 Å by DC sputtering under a pressure of $3 \times 10^{-3}$ Torr of a mixed atmosphere of Ar and oxygen by means of an alloy target of Zr:Si=1:2. The refractive index of this film was 1.74. On this film, an ITO film was formed in a thickness of 8,000 Å by ion plating.

COMPARATIVE EXAMPLE 3

A glass substrate was set in a vacuum chamber, which was evacuated to $1 \times 10^{-5}$ Torr. Than, a $TiO_2$ film was formed in a thickness of 120 Å by DC sputtering of a titanium target under a pressure of $3 \times 10^{-3}$ Torr of a gas mixture of Ar and oxygen. Then, a $ZrSi_xO_y$ film was formed in a thickness of 400 Å by DC sputtering using an alloy target of Zr:Si=1:9 in a gas mixture of Ar and oxygen. On this film, an ITO film was formed in a thickness of 8,000 Å by ion plating.

Figure 12:
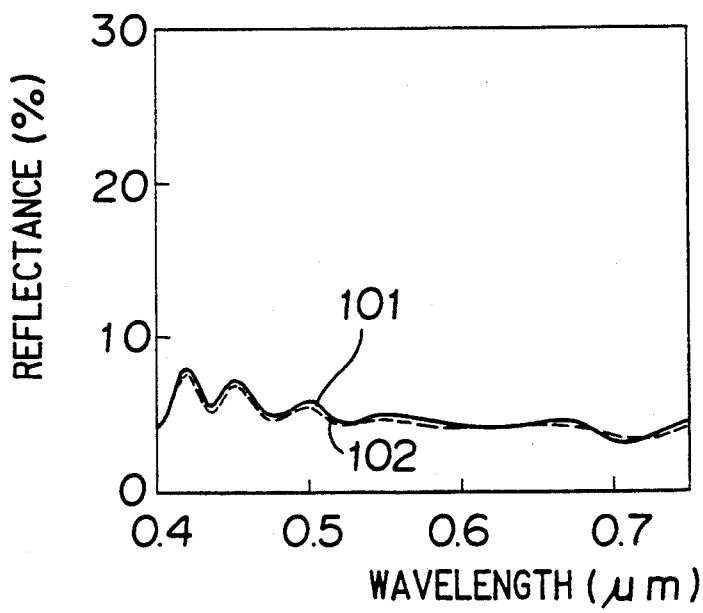
FIG. 12 is a graph showing the spectral reflection curve of sample 4 of Example 17.

From the comparison of spectral reflectance curves in FIGS. 9 to 13, it is evident that as compared with the case where a transparent film was simply formed on a glass substrate (Comparative Example 1, 111 in FIG. 13), the ripples in the visible region are substantially small in each of the spectral reflectance curve measured from the film surface side in the case where an underlying layer of the present invention is formed (Example 1, 71 in FIG. 9), the spectral reflectance curve measured from the glass surface side in the case where an overlying layer of the present invention is formed (Example 7, 82 in FIG. 10), the spectral reflectance curves measured from the film surface and glass surface sides in the case where an overlying layer and an underlying layer of the present invention were formed simultaneously (Example 13, 91 and 92 in FIG. 11) and the spectral reflectance curves measured from the film surface and glass surface sides in the case of a laminated glass having an underlying layer and an overlying layer of the present invention are formed (Example 17, 101 and 102 in FIG. 12). The minimum value of ripple and the minimum value of ripple ratio in the visible region are presented in Table 4. In Table 4, the "film surface side" means the value measured from the opposite side of the glass substrate with respect to the transparent film, and the "glass surface side" is the value measured from the glass substrate side with respect to the transparent film.

TABLE 4

|  | Thickness of underlying layer (Å) | Thickness of Overlying layer (Å) | Minimum value of ripple (%) | | Minimum value of ripple ratio (± %) | |
|---|---|---|---|---|---|---|
|  |  |  | Film surface side | Glass surface side | Film surface side | Glass surface side |
| Example 1 | 80 | — | 1.1 | — | 4.4 | — |
| Example 2 | 60 | — | 1.5 | — | 6.0 | — |
| Example 3 | 30 | — | 0.5 | — | 2.0 | — |
| Example 4 | 90 | — | 0.9 | — | 3.6 | — |
| Example 5 | 40 | — | 1.3 | — | 5.2 | — |
| Example 6 | 50 | — | 0.7 | — | 2.8 | — |
| Example 7 | — | 150 | — | 0.8 | — | 7.0 |
| Example 8 | — | 70 | — | 1.8 | — | 15.8 |
| Example 9 | — | 60 | — | 0.9 | — | 7.9 |
| Example 10 | — | 200 | — | 0.5 | — | 4.4 |
| Example 11 | — | 100 | — | 0.7 | — | 6.1 |
| Example 12 | — | 140 | — | 0.4 | — | 3.5 |
| Example 13 | 80 | 150 | 1.2 | 1.2 | 2.6 | 7.1 |
| Example 14 | 80 | 200 | 1.9 | 0.6 | 4.2 | 3.3 |
| Example 15 | 30 | 100 | 1.1 | 0.9 | 2.4 | 5.1 |
| Example 16 | 40 | 140 | 2.1 | 1.1 | 4.5 | 6.0 |
| Example 17 | 80 | 80 | 1.0 | 1.0 | 10.4 | 10.4 |
| Comparative Example 1 | — | — | 10.6 | 10.6 | 37.9 | 37.4 |
| Comparative Example 2 | 900 | — | 0.5 | 0.5 | 1.8 | 1.8 |
| Comparative Example 3 | 520 | — | 0.3 | 0.3 | 1.1 | 1.1 |

TABLE 5

| | Absolute value of the effective Frensnel reflection coefficient | |
|---|---|---|
| | Underlying layer *1 | Overlying layer *2 |
| Example 1 | 0.030 | — |
| Example 2 | 0.072 | — |
| Example 3 | 0.033 | — |
| Example 4 | 0.037 | — |
| Example 5 | 0.057 | — |
| Example 6 | 0.041 | — |
| Example 7 | — | 0.035 |
| Example 8 | — | 0.064 |
| Example 9 | — | 0.079 |
| Example 10 | — | 0.037 |
| Example 11 | — | 0.050 |
| Example 12 | — | 0.048 |
| Example 13 | 0.030 | 0.035 |
| Example 14 | 0.030 | 0.037 |
| Example 15 | 0.033 | 0.050 |
| Example 16 | 0.057 | 0.048 |
| Example 17 | 0.030 | 0.030 |

*1: Absolute value of an effective Frensnel reflection coefficient on the transparent film side at the combined boundary of glass substrate (n = 1.51)/underlying layer/transparent film.
*2: Absolute value of an effective Frensnel reflection coefficient on the transparent film side at the combined boundary of transparent film/overlying layer/air (Examples 1 to 16) or transparent film/overlying layer/ingerlayer (Example 17).

With respect to Examples 1 to 17, the absolute value of the effective Frensnel reflection coefficient (the calculated value at a designed wavelength $\lambda = 6,328$ Å) is shown in Table 5. Further, with respect to Comparative Examples, the absolute value of the Frensnel reflection coefficient (the calculated value at a designed wavelength $\lambda = 6,328$ Å) is shown in Table 6. The refractive indices n and the extension coefficients k (values measured at a designed wavelength $\lambda = 6,328$ Å) of various materials used for the calculation of the values in Tables 5 and 6, are shown in Table 7.

TABLE 6

| | Absolute value of the effective Frensnel reflection coefficient | |
|---|---|---|
| | Underlying layer | Overlying layer |
| Comparative Example 1 | (0.138) (*1) | (0.333) (*2) |
| Comparative Example 2 | 0.01 (*3) | |
| Comparative | 0.028 (*3) | |

TABLE 6-continued

| | Absolute value of the effective Frensnel reflection coefficient | |
|---|---|---|
| | Underlying layer | Overlying layer |
| Example 3 | | |

(*1) Absolute value of the Frensnel reflection coefficient on the transparent film side at the boundary of glass substate ( n = 1.51)/transparent film.
(*2) Absolute value of the Frensnel reflection coefficient on the transparent film side at the boundary of transparent film/air.
(*3) Absolute value of the effective Frensnel reflection coefficient on the transparent film side at the combined boundary of glass substrate (n = 1.51)/underlying layer/transparent film.

TABLE 7

| Material | Refractive index $n$ | Extinction coefficient $k$ |
|---|---|---|
| TiN | 1.98 | 1.53 |
| CrN | 3.10 | 2.03 |
| CrC | 3.56 | 2.26 |
| ZrN | 1.82 | 1.17 |
| Cr | 3.11 | 3.26 |
| Ti | 2.65 | 3.67 |
| $TiO_2$ | 2.40 | 0 |
| $ZrSi_2O_x$ | 1.74 | 0 |
| $ZrSi_9O_x$ | 1.52 | 0 |
| ITO | 2.0 | 0 |
| ZnO:Al | 2.0 | 0 |

Notes:
The above values measured at a designed wavelength $\lambda = 6,328$ Å
The amount of Al doped in ZnO:Al is 2 wt % as calculated as oxide $(Al_2O_3/(Al_2O_3 + Zn)$.

In all Examples, the ripple of spectral reflectance at the intended side is evidently substantially small as compared with Comparative Example 1.

Comparative Examples 2 and 3 represent cases wherein the ripple-suppressing layer was formed by a transparent film (non-absorbing film). In these cases, ripples were small on both sides, but the film thickness of the underlying layer was as thick as from 5 to 10 times as compared with the present invention. This constitutes a serious practical problem. Whereas, according to the present invention, the thickness of the underlying layer or the overlying layer can be thin, and the film-forming speed can usually be increased as compared with the formation of such a transparent film, whereby the time required for film formation can be shortened more than the thickness ratio. Thus, the present invention is superior in the productivity.

As is evident from the foregoing Examples, the present invention presents an effect of effectively suppressing ripples which appear in the spectral reflection spectrum when a transparent film with a high refractive index is formed on a transparent substrate in a thickness of a certain level.

Particularly, when an underlaying layer is formed according to the present invention, there will be an effect of suppressing ripples in the spectral reflection spectrum on the film surface side (the opposite side of the transparent substrate), and when an overlying layer is formed according to the present invention, there will be an effect of suppressing ripples in the spectral reflection spectrum on the transparent substrate side.

Further, when an underlying layer and an overlying layer are both formed according to the present invention, there will be an effect of suppressing ripples in the spectral reflection spectrum on each of the transparent substrate side and the opposite side.

Consequently, an effect of preventing iridescence due to a change of viewing angle or due to a non-uniformity of the thickness of the transparent film with a high refractive index, can be obtained. This brings about a particularly remarkable effect when the present invention is applied to a glass substrate having a large area.

Further, in the present invention, an absorbing film is used as the ripple-suppressing layer, whereby the transmittance of the glass structure decreases as a whole. Accordingly, when such a glass structure is applied to e.g. buildings, a solar energy entering into a room through a window can be suppressed, whereby the load for air conditioning can be reduced. Further, the reflectance can be made high, whereby the appearance of the building can be improved.

A substantial effect of the present invention is that as compared with a non-iridescent glass which we proposed earlier (Japanese Patent Applications No. 201148/1990 and No. 275240/1990), the thickness of the ripple-suppressing layer can be made thin by using an absorbing film, whereby the time required for the production, which is a practically serious matter, can be substantially shortened.

What is claimed is:

1. A non-iridescent transparent product comprising a transparent substrate, a transparent film having a refractive index of at least 1.6 and a thickness of at least 0.15 μm formed on the substrate, and an underlying layer, having a thickness of 10 to 500 Å, formed at the boundary between the substrate and the film, wherein the underlying layer is an absorbing layer with an extinction coefficient k being at lest 0.01; and wherein when the product is observed from the side of the transparent substrate opposite to the side the transparent film is applied on, the minimum value of the ripple ratio of the spectral reflectance curve in the visible light region is within ±30%.

2. The non-iridescent transparent product according to claim 1, wherein at a wavelength in the visible light region, the absolute value of the effective Frensnel reflection coefficient on the transparent film side at the combined boundary of transparent substrate/underlying layer/transparent film is smaller than the absolute value of the Frensnel reflection coefficient on the transparent film side at the boundary of transparent substrate/transparent film in a case where no such underlying layer is formed.

3. The non-iridescent transparent product according to claim 1, wherein at a wavelength in the visible light region, the refractive index n and the extinction coefficient k of the complex refractive index n-ik of the underlying layer, are within the region (inclusive of the boundary line) defined by curve A ... straight line H . . . straight line I . . . curve F . . . straight line G in FIG. 1.

4. The non-iridescent transparent product according to claim 1, wherein the underlying layer contains at least one film layer consisting of at least one metal selected from the group consisting of titanium, chromium, zirconium, titanium nitride, chromium nitride, zirconium nitride, titanium carbide, chromium carbide, zirconium carbide, and composites thereof.

5. A non-iridescent transparent product comprising a transparent substrate, a transparent film having a refractive index of at least 1.6 and a thickness of at least 0.15 μm formed on the substrate, and an overlying layer, having a thickness of 20 to 500 Å, formed on the transparent film, wherein the overlying layer is an absorbing layer with an extinction coefficient k being at least 0.01; and wherein when the product is observed from the transparent substrate side, the minimum value of the ripple ratio of the spectral reflectance curve in the visible light region is within ±30%.

6. The non-iridescent transparent product according to claim 5, wherein at a wavelength in the visible light region, the absolute value of the effective Frensnel reflection coefficient on the transparent film side at the combined boundary of transparent film/overlying layer/air is smaller than the absolute value of the Frensnel reflection coefficient on the transparent film side at the boundary of transparent film/air in a case where no such overlying layer is formed.

7. The non-iridescent transparent product according to claim 5, wherein at a wavelength in the visible light region, the refractive index n and the extinction coefficient k of the complex refractive index n-ik of the overlying layer, are within the region (inclusive of the boundary line) defined by curve J . . . straight line S . . . straight line T . . . curve Q . . . straight line R in FIG. 3.

8. The non-iridescent transparent product according to claim 5, wherein the overlying layer contains at least one film layer consisting mainly of at least one metal selected from the group consisting of titanium, chromium, zirconium, titanium nitride, chromium nitride, zirconium nitride, titanium carbide, chromium carbide, zirconium carbide and composites thereof.

9. A non-iridescent transparent product comprising a first transparent substrate, a transparent film having a refractive index of at least 1.6 and a thickness of at least 0.15 μm formed on the substrate, and an overlying layer, having a thickness of 10 to 500 Å, formed on the transparent film, and a second transparent substrate laminated on the overlying layer, wherein when the product is observed from the first transparent substrate side, the minimum value of the ripple ratio of the spectral reflectance curve in the visible light region is within ±30%.

10. The non-iridescent transparent product according to claim 9, wherein at a wavelength in the visible light region, the absolute value of the effective Frensnel reflection coefficient on the transparent film side at the combined boundary of transparent film overlying layer/second transparent substrate is smaller than the absolute value of the Frensnel reflection coefficient on the transparent film side at the boundary of transparent film/second transparent substrate in a case where no such overlying layer is formed.

11. The non-iridescent transparent product according to claim 9, wherein the first transparent substrate is a glass substrate, the second transparent substrate is a plastic interlayer, and another glass substrate is laminated on the plastic interlayer on the opposite side of the transparent film, to form a laminated glass structure.

12. A non-iridescent transparent product comprising a transparent substrate, a transparent film having a refractive index of at least 1.6 and a thickness of at least 0.15 μm formed on the substrate, an underlying layer having a thickness of from 20 to 200 Å formed at the boundary between the substrate and the film, and an overlying layer having a thickness of from 80 to 300 Å formed on the transparent film, wherein both of the underlying and overlying layers with an extinction coefficient k being at least 0.01; and wherein when the product is observed from the underlying layer side or from the overlying layer side, the minimum value in the visible light region of the ripple ratio of the spectral reflectance curve is within ±30%.

13. The non-iridescent transparent product according to claim 12, wherein at a wavelength in the visible light region, the absolute value of the effective Frensnel reflection coefficient on the transparent film side at the combined boundary of transparent substrate/underlying layer/transparent film is smaller than the absolute value of the Frensnel reflection coefficient on the transparent film side at the boundary of transparent substrate/transparent film in a case where no such underlying layer is formed, and at a wavelength in the visible light region, the absolute value of the effective Frensnel reflection coefficient on the transparent film side at the combined boundary of transparent film/overlying layer/air is smaller than the absolute value of the Frensnel reflection coefficient on the transparent film side at the boundary of transparent film/air in a case where no such overlying layer is formed.

14. The non-iridescent transparent product according to claim 12, wherein both the underlying and overlying layers are films of titanium nitride.

15. The non-iridescent transparent product according to claim 12, wherein the transparent film is a film composed mainly of indium tin oxide (ITO).

* * * * *